Figure 1:
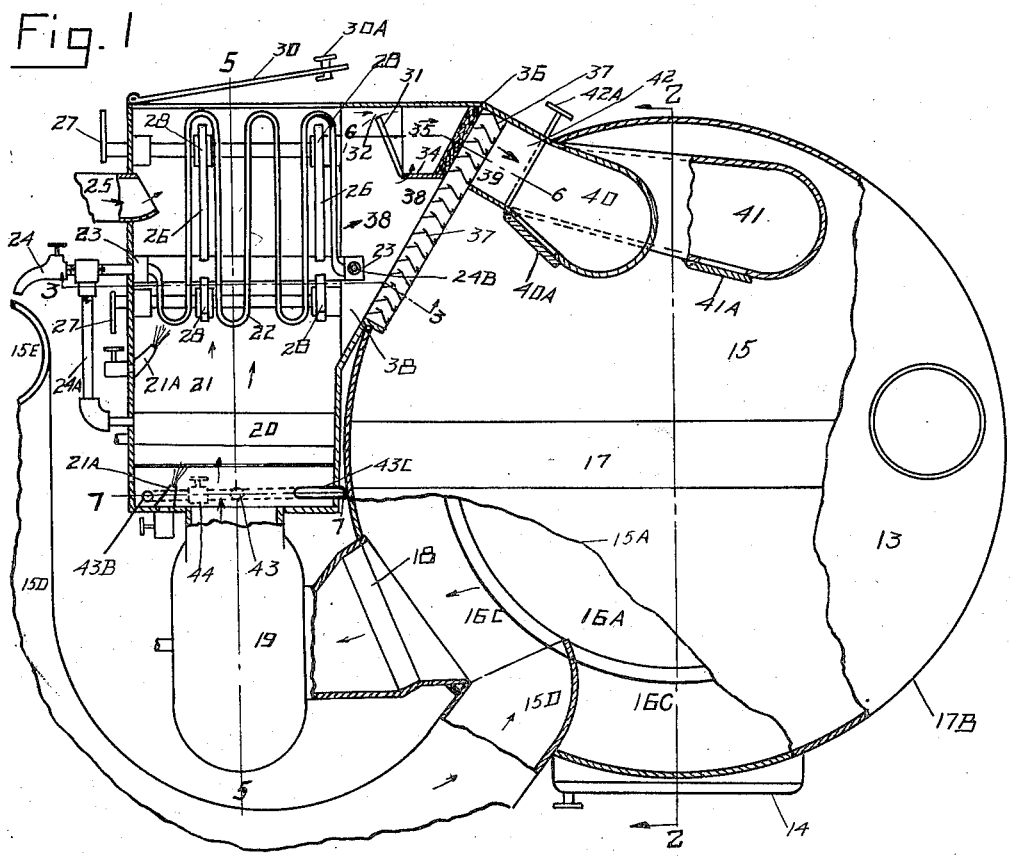

May 26, 1936.　　R. A. SHEFFIELD　　2,041,870
AIR CONDITIONING EQUIPMENT
Filed June 23, 1932　　5 Sheets-Sheet 1

Raymond A. Sheffield Inventor
By Charles W. Lovett
Attorney

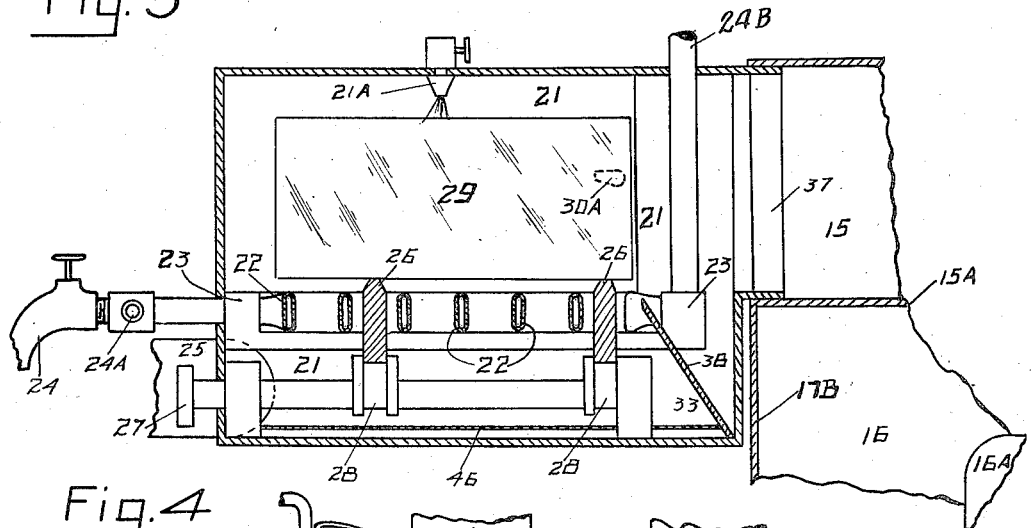
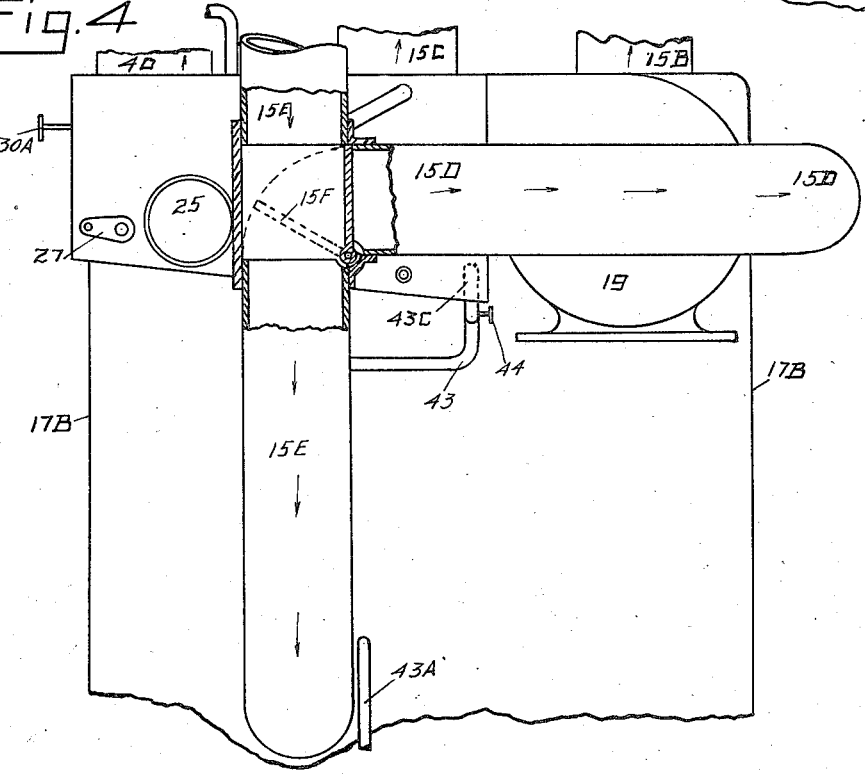

May 26, 1936.　　　R. A. SHEFFIELD　　　2,041,870
AIR CONDITIONING EQUIPMENT
Filed June 23, 1932　　　5 Sheets-Sheet 3

Raymond A. Sheffield Inventor
By Charles W. Lovell
Attorney

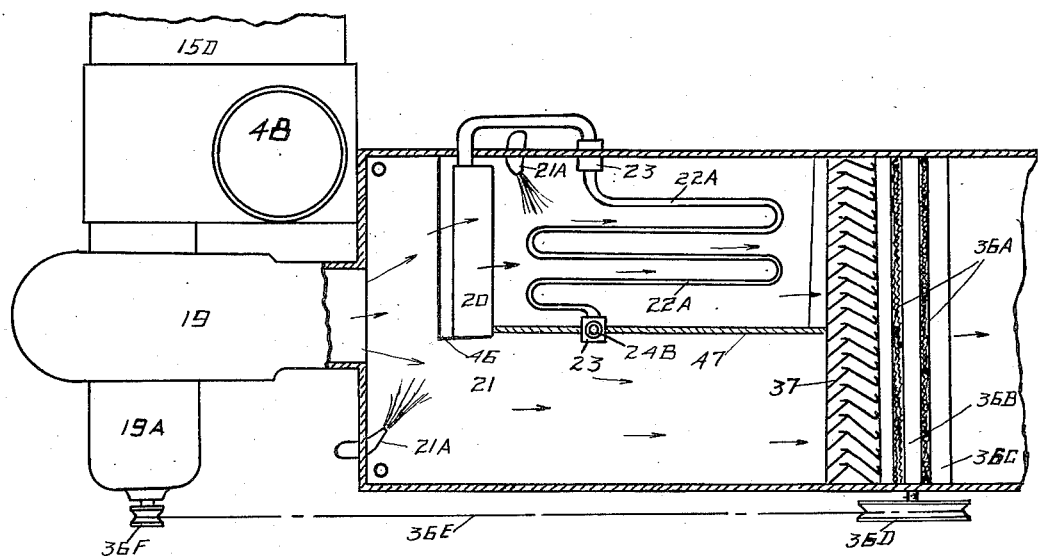
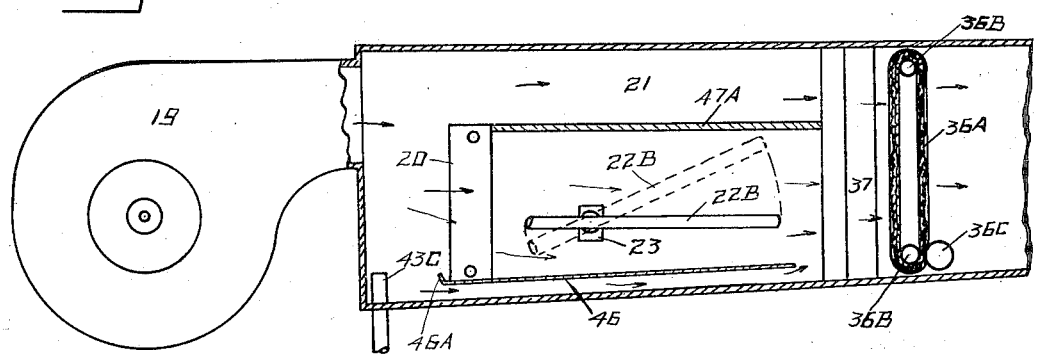

May 26, 1936.    R. A. SHEFFIELD    2,041,870
AIR CONDITIONING EQUIPMENT
Filed June 23, 1932    5 Sheets-Sheet 5

Raymond A. Sheffield Inventor
By Charles W. Lovett
Attorney

Patented May 26, 1936

2,041,870

UNITED STATES PATENT OFFICE 2,041,870

AIR CONDITIONING EQUIPMENT

Raymond A. Sheffield, Boston, Mass.

Application June 23, 1932, Serial No. 618,892

23 Claims. (Cl. 257—9)

This invention relates to improved means for air conditioning and means for the distribution of air within a given enclosure, and control of same, also combination means for preparing and supplying chilled water for drinking purposes.

It has for its objects to provide new and improved means for supplying a desirable atmospheric temperature and condition within a given enclosure at a minimum of expense; to provide, by a series of combinations, means for the conditioning and constant changing of the air, cold or otherwise, within a given enclosure; to provide means for distributing dehumidified cold air to certain rooms or areas, and means for separating same from air of higher temperature and moisture content; to avoid the contact of the air with other than clean surfaces and areas; to provide by an improved construction and use of gravity for the utilization of heating or cooling values contained in waste water without pumps with the resulting noise and maintenance expense; to eliminate the possibility of damage to heater castings and other parts due to excessive moisture in the air when such air passes through the heating unit; to eliminate the use of an excessive amount of water to obtain a given amount of humidity, and to supply such humidity by air washing after the air has been heated; to accomplish the above purposes without a preheating of the water; by sheer efficiency to accomplish ideal humidifying results in such limited expense and time as to render only relatively short intervals of operation necessary; to eliminate the so-called burning out of furnaces by eliminating filters in furnace intakes with the resulting clogging and well known disastrous results; to provide a system of plural purposes, adaptable for heating and humidifying air during cold weather, and for the dehumidifying, cooling, and circulating of air during warm weather; by new and novel means, to divert the dehumidified air and mix it with air not dehumidified, so as to provide and circulate air of a desired humidity to a particular and restricted area or areas; to provide improved equipment adaptable for the use with mechanical refrigeration or ice in the process of dehumidifying and cooling air; by a multiple using of the cold waste water from the air chamber, to materially reduce the cost of air chilling and dehumidifying; to provide an efficient and versatile installation at a minimum cost; to provide a new and novel means for quick melting of the ice with the resulting cooling effect, when ice is used, and to conserve the ice otherwise; to provide a new and novel adjustable coil and coil mounting, rendering the coil adaptable when in horizontal position, for use as a rest for the ice, when ice is used, and also in adjustable, vertical, or near vertical position when ice is not used; to provide improved means to avoid the bottom of the washer unit from sweating; to provide a new and novel means and arrangement by which the coldest air in the coldest room or area is returned to the coldest part of the cooling chamber, and then diverted again to the same coldest area but in a still colder condition; to provide a system which may likewise be used in the winter time for particular room or rooms desiring higher relative humidity; and to provide the various other advantages and results made evident from the following specification.

Air conditioning as used herein means the distribution of conditioned air within a given enclosure, which air has been heated if too cold, cooled if too warm, moisture removed if too moist, moisture added if too dry, pressure decreased or increased as required, adding contents, e. g. ozone, when required, transferring the air when and where desired at any velocity and in any quantity, cleaning it if unclean, and thus conditioning the air for utmost comfort and health.

Figure 2:
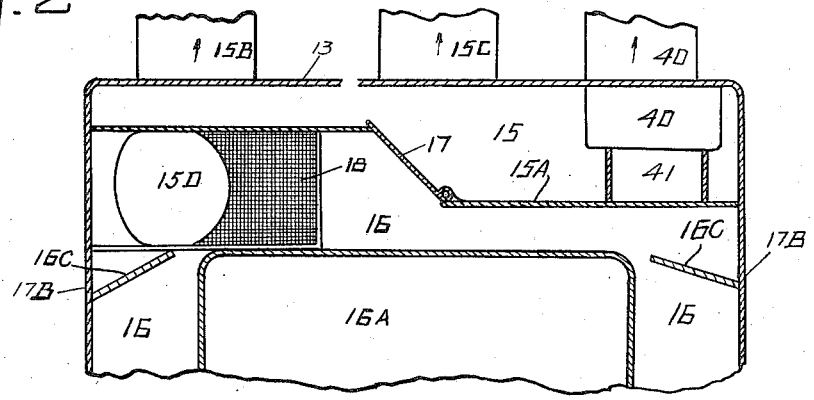
Figure 5:
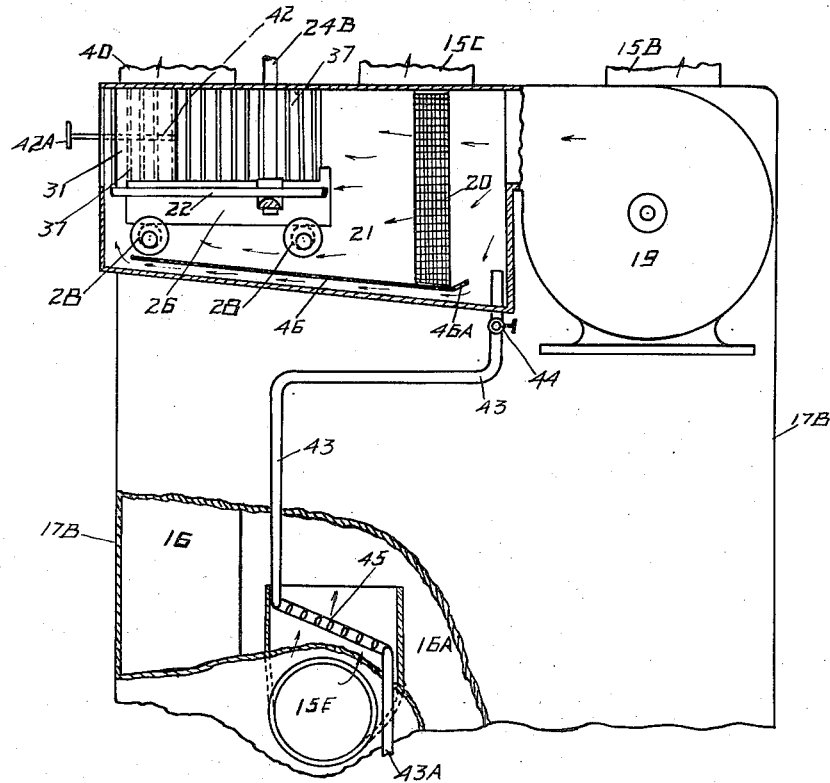
Figure 6:
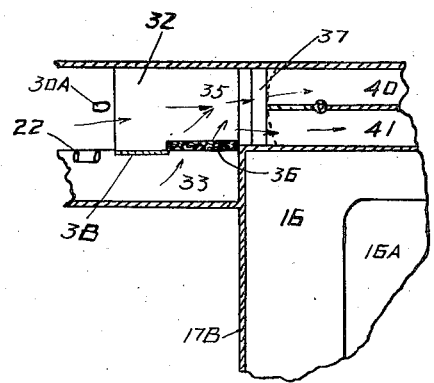
Figure 7:
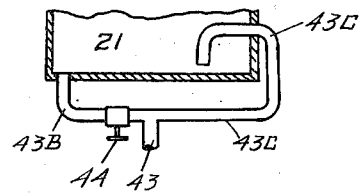
Figure 10:
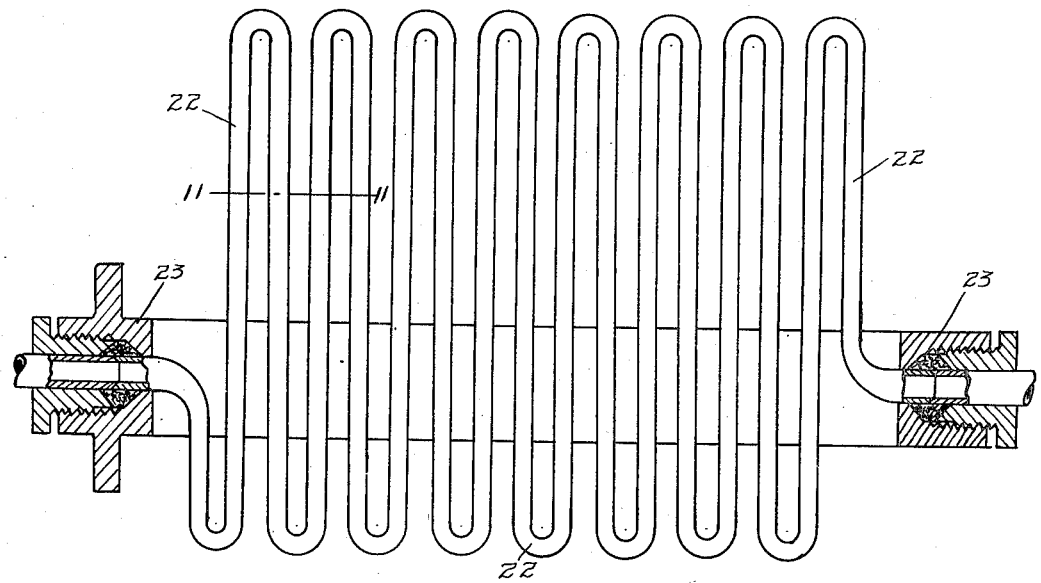
Figure 11:
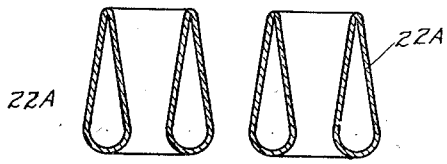
Figure 12:
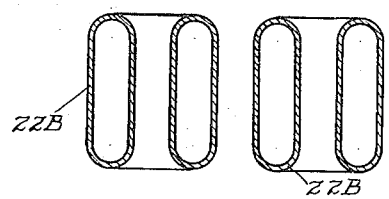

Referring to the accompanying drawings which form a part of this specification and in which similar letters of reference refer to similar parts throughout the various views, Figure 1 shows a plan view of a warm air furnace in combination with my air conditioning equipment, the metal covering of which has been cut away to show the position of the parts thereunder. Figure 2 shows a cross sectional view on the line 2—2 in Figure 1. Figure 3 shows a cross sectional view on the line 3—3 in Figure 1. Figure 4 is a side view looking from the left to the right in Figure 1. Figure 5 shows a cross sectional view on the line 5—5 in Figure 1 looking from left to right. Figure 6 shows a cross sectional view on the line 6—6 in Figure 1, showing the sponge-like material in optional position. Figure 7 shows in elevation, the detail of the air chamber drain and water level control on the line 7—7 in Figure 1. Figure 8 shows a partial view of an optional construction for my equipment in which the air chamber is divided into two parts by a vertical partition, only one of which parts contains a coil and is adaptable to receive ice or mechanical refrigeration. This figure also shows the means by which the moisture is added to the air or extracted from the air by the sponge-like material. Figure 9 is an elevation view substantially the same as the plan view in Figure 8, except the partition is horizontal rather than vertical, and the coil is shown in optional construction and adjustable position. This figure also shows the detail of the means by which the moisture content of the air is increased or decreased as desired and the accumulated moisture in the sponge removed. Figure 10 shows an enlarged view of the coil construction and the swivel hinges upon which it is mounted. Figure 11 shows a cross sectional view of the coil on the lines 11—11 in Figure 10. Figure 12 shows an optional cross sectional view of the coil.

Referring again to Figure 1 of the drawings, 13 shows the metal covering the top of the warm air furnace and equipment, the same being cut away to disclose the construction and parts thereunder. 14 shows the furnace door positioned at the front of the furnace. 15 shows the plenum chamber cut away at 15A to show the heat collecting area 16 thereunder, in the center of which is the furnace radiator 16A, the plenum chamber 15, and heat collecting area 16, being connected or disconnected by the damper 17. 17B shows the furnace casing. 18 shows the filter through which the air is drawn from that part of the heat collecting area above the guard 16C, which guard, during the period the furnace is operating deflects and directs the air in the heat collecting area 16, directly on to the heating drum 16A, and thus prevents drawing less heated air from the heat collecting area 16. The operation of the air blower 19, forces the air through the radiator 20, positioned in the air chamber 21, throughout which a mist is sprayed by the spray nozzles 21A. 22 shows the coil pivotally mounted upon the hinge connections 23. The radiator 20 and the coil 22 are connected by the pipe 24A. 24B shows the connecting pipe from the water system, refrigeration or heating unit. 24 shows a tap through which chilled water may be drawn for drinking purposes. 25 shows the duct from the coldest conditioned area. 26 shows the ice carriage positioned between the coil pipes 22 and elevated or lowered as desired by movement of the handle 27 controlling the eccentrics 28. 29 (in Figure 3) shows a block of ice in position over the coil 22. 30 shows the door into the air chamber through which ice may be supplied when desired. 30A shows the handle thereof. 31 shows a damper designed to control the volume of air passing through the passageway 32, which passageway is adaptable to receive part of the air from above the coil as it comes around and over the top of the ice 29, positioned on the coil 22, in contra-distinction to the cold and dehumidified air which passes beneath the ice, through the passageway 33, under the diverting partition 38 in Figure 3, and then under the partition 34, best shown in Figure 1, in Figure 6 the air now passes through the moisture absorbing material 36 which tends to dehumidify the air before it enters the passageway 35, where it mingles with the air from the passageway 32, resulting in a proper mixture of air. In Figure 1, showing the optional position of the sponge-like material 36, the air passes through the sponge-like material after being mixed. The air then strikes and passes between the baffle plates 37. The air then passes through the passageway 39 from whence, by operation of the damper 42, operated by the handle 42A, it can be diverted either to the passageway 40 or 41, or both, for direct distribution to a particular area or areas desired to be chilled. The passageways 40 and 41 are built within the plenum chamber area, but are separate and distinct therefrom except when dampers 40A and 41A are open. That portion of the air which passes over and around, but not beneath the ice 29, goes directly through the baffles 37 into the plenum space 15, and thence to the various rooms or areas through the passageways 15B and 15C (shown in Figure 2), thus promoting air circulation throughout the conditioned area. During cold weather, when there is no desire for cool air, the ice 29 in the conditioning chamber is eliminated, and the air passing from the air conditioning chamber 21, then passes directly through the baffle plates to the plenum chamber with the exception of a portion thereof which enters the passageways 40 and 41 through the passageway 32. The volume of the air so passing through the passageway 32 is controlled by operation of the damper 31.

Referring again to Figure 2, 15B and 15C show distributing outlets from the plenum chamber 15 to areas to be conditioned. 15D shows a by-pass adaptable for use with the conditioning system when the temperature is sufficiently high in the conditioned areas and a circulation of the air is desired without heat. This by-pass 15D is connected with the air recirculation duct 15E, and the passage of air therethrough is controlled by the damper 15F shown in Figure 4.

Referring again to Figure 3, 24B shows the water pipe leading to the coil 22, pivotally mounted at 23 and connected optionally to the city water supply, mechanical refrigeration, or heating medium as desired.

Referring again to Figure 4, 25 shows the duct connecting the air chamber to the coldest conditioned area, and is adaptable to convey cool air from said coldest connected conditioned area into the air chamber 21 below the ice 29 and the coil 22, and thence for redistribution to the coldest conditioned area as heretofore described. 43 shows the drain from the lower portion of the air chamber in which water is optionally allowed to accumulate. 44 shows the valve which, when closed, permits the water to accumulate on the bottom of the air chamber. Referring to Figure 5, 45 shows a supplementary coil, positioned in the path of the incoming air which is to be circulated throughout the system. This coil is connected with the outlet 43 from the air chamber, and is adaptable to insure a maximum utilization of the heat and cold in the water as it is drained from the air chamber.

Referring again to Figure 5, 43 shows the drain from the air chamber 21, through which the water passes from the bottom of the air chamber 21 to the coil 45 and to the drain at 43A. 46 shows what might be termed a drip pan, positioned in the air chamber substantially parallel to the bottom thereof, and beneath the ice 29, the drip pan 46 adaptable to receive the drip and collect the moisture from the spray within the air chamber and divert it toward the drain leading from said chamber. This drip pan is designed to avoid the dripping against the bottom of the air chamber and to prevent the sweating thereof. It also affords an additional cold contact surface for the air as it passes through the air chamber. The deflector 46A, allows some air to flow under said plate.

Referring to Figure 7, 43 shows the drain from the air chamber. 43B shows a connection with the drain from the bottom of the air chamber, adaptable for use when no water is desired within the chamber. When water is desired within the chamber, the valve 44 is closed, and when closed, water will accumulate within the chamber to a level with the top of the outlet 43C. The outlet 43C is crooked at its end so as to allow the opening therein to be close to the bottom of the air chamber 31, for the purpose of drawing the cooler water from the bottom of the air chamber rather than the warm water at the top.

Referring to Figure 8, 47 shows the vertical partition hinged so as to divert the air into or away from the adjustable coil thus dividing the air chamber 21 into two parts, in one part of which is an adjustable coil 22A, the other part being left unobstructed for the free passage of air. The placing of this partition 47 controls the humidity and temperature of air leaving the air chamber. 36A shows an optional construction of the moisture absorbing unit. The lower roller 36B is provided with an external pulley 36D connected by a belt 36E to a smaller pulley 36F on the air blower motor. As the air blower motor 19A operates, the pulley 36D is rotated and in turn revolves the moisture absorbing unit 36A, mounted upon the rollers 36B, to the end that moisture is removed from the unit 36A by the pressure exerted by the roller 36C. As the moisture accumulates at the bottom of the air chamber, it flows to the drain leading from the air chamber. This moisture absorbing unit is also adaptable for picking up the moisture from the bottom of chamber 21 as shown in Figure 9 when water is allowed to flow in by spray nozzles 21A Figure 8 and allowed to accumulate by closing valve 44 Figure 7 until it reaches the height of 43C Figure 9.

Referring to Figure 9, 47A shows a horizontal partition dividing the air chamber 21 which is hinged on the end nearest element 20. When this adjustable partition is lowered the increased resistance would tend to force most of the air above the partition. When using this construction, the coil 22B extends the full width of the air chamber 21.

Referring again to Figures 10, 11, and 12, 22 designates the preferable shape of the tubing from which the coil is formed, the object being to provide a construction in which the ratio of the heating or cooling surface in relation to the internal content of holding capacity is in proper proportion. 22B shows an optional form of coil which may be used with efficient results. 23 shows the detail of the pivot mounting connections used in adjusting the coil 22 to the desired angle. 48 is an air intake through which the blower 19 draws the air, optionally from the top of a furnace, from a return duct, or elsewhere.

A plenum chamber, optionally divided into a plurality of sections, is formed above the heat collecting area and is separated therefrom by a horizontal partition above said heat collecting area, which heat collecting area is around and above the radiator of the furnace. The hot air is drawn from the heat collecting area, through an air filter, preferably of fine wire mesh, contained in the upper part of the heat collecting area casing, by and through an air blower, or blowers, electrically operated or otherwise, which air blower, or blowers, force the air through the structure hereinafter named, comprising a washing and conditioning air chamber having a series of spray nozzles, or other means therein, adaptable to project a spray or mist into and throughout said washer chamber, and having also therein, in connected relation, a water pipe coil, which optionally functions as means for supporting a cake of ice, and a radiator, either or both adaptable to function with connected water supply or mechanical refrigeration, said last mentioned radiator and coil adaptable for use in cooling air during warm weather, or optionally adaptable for heating use. Said air chamber also contains a series of baffle plates, and means for controlling the air so as to cause it to strike and pass between certain baffles in said chamber, and means for controlling the humidity of the air which passes therefrom to a particular room, rooms, or area in contradistinction to general distribution throughout said baffle chamber and all the area said equipment is adaptable to heat or cool, said baffles or scrubbing plates being adaptable to collect and remove excess moisture carried in the air, if any, as well as any foreign matter which may have succeeded in passing through the filter above-mentioned. Moisture absorbing means is also positioned within said chamber for use in warm weather, and such means when combined with a moisture supplying source may be used as an air humidifier and cleaner during cold weather. Moisture extracting means is also provided. The air then passes into said plenum chamber or one of its optional sections, from which it is distributed to the desired room, rooms, or areas.

In event this equipment is combined with steam heat, hot water heat, or other heating medium, the heating element, coil or radiator, or both, may be utilized for heating purposes in cold weather as well as for cooling purposes in warm weather. When used for cooling the entire conditioned area, a partition is installed in the air chamber that the temperature and humidity may be thereby controlled. Either the coil and radiator or both may also be used for auxiliary heat during less warm, severe, or mildly cool weather, while the furnace is or is not in operation. They may also be used in connection with an auxiliary heating unit in extremely cold weather, to increase the heat output of the equipment. The increase of the ratio of the heating or cooling surface of the coil in relation to its internal content or holding capacity is secured by forming the coil from what may be termed a somewhat flat or wedged shape tube, as shown in the accompanying drawings, formed to afford an advantageous contact with ice, when ice is used, and afford at all times, a maximum heat or cold transfer surface. A maximum amount of ice melting is secured when the water sprays function and the ice rests upon the coil of the wedge shaped tubes with water passing therethrough. When less cooling is desired, the sprays are shut off and the ice may be raised from its contact with the coil by the mechanism shown in the drawings.

For cold weather use, when the radiator in the air chamber is used as a heating medium, I provide at the bottom of the air chamber means for accumulating the waste water from the system by operation of valve, and means for discharging said water when its use is not desired. It will be understood that as this water accumulates, it contains more or less heat, and that the hottest portion rises to the top. As the air is forced through the chamber by the blower, and comes into contact with the warm upper surface of the waste water, it absorbs the heat therein together with some moisture and then passes on through the heater, through the air chamber and baffles to the areas to be conditioned. During cold weather operation, the waste water from the sprays flows through a drain pipe having provision for controlling the level of water in the air chamber to and through a supplementary coil situated in the path of the system's air intake, at which place the heat in the water is transmitted to the passing air on its way to the sewer. During warm weather operation, waste water is disposed of immediately that it might not be absorbed by the passing air, the waste water is cold and normally absorbs the heat from the passing air as it passes through the supplementary coil positioned at the air intake.

Available ice storage is positioned above the bottom of the air chamber and the drain therefrom is connected to the air chamber, thus increasing the efficiency of the washer during warm weather, and affording less loss from the storage ice when melting.

A plate, preferably of noise absorbing quality, is positioned below the coil at the bottom of the washer chamber to avoid sweating and to provide additional cooling surfaces for dehumidifying within the air chamber. One end of the plate is formed so as to properly proportion the amount of air passing beneath the plate.

A damper is installed between the heat collecting area and the plenum chamber to provide means for cutting off the system and allowing normal furnace operation. Dampers are also provided in each passageway leading to rooms to be especially cooled.

For warm weather operation, an element of moisture absorbing quality, preferably of sponge-like materials, is positioned in the air chamber, adaptable to absorb some moisture in the air as it passes through the air chamber on its way for distribution to the area to be conditioned. Moisture extracting means are provided to remove moisture from the sponge-like material. Provision is also made to have the sponge-like material pick up moisture from the bottom of the air chamber for the purpose of cooling the air as it passes therethrough. The water in the sponge-like material being cold, the temperature of the contacting air will be lowered.

While I have illustrated and described a preferred construction for carrying my invention into effect, this is capable of variation or modification without departing from the spirit of the invention. I, therefore, do not wish to be limited to the exact details of construction herein set forth, but desire to avail myself of such variations and modifications as come within the scope of the appended claims.

It will be understood that in operating the installation and equipment as a heat unit, and for convenience in description utilizing the embodiment of the warm air furnace pictured in the drawings, the air is drawn from the heat collecting area 16, which is positioned over the fire box, through the filter 18 by operation of the air blower 19, through the radiator 20, and through the air chamber 21 which is filled with a mist from the sprays 21A, over the coil 22, through the passageways to and through the baffle plates 37, into the plenum chamber 15, and distributing pipes to the areas to be heated.

It will be understood that when the radiator 20 and the coil 22 are utilized in connection with the system in furnishing heat, the radiator and coil are filled with steam, hot water, or other means of radiation, and act either as a booster or auxiliary heat when required in addition to the heat furnished by the furnace itself, or as a heating means exclusively.

It should be understood that the embodiment shown in Figures 1 and 2 disclose the general arrangement of the system as it would be installed on a new furnace installation. On the other hand, the embodiment shown in Figures 8 and 9 discloses the system as it may be used with a furnace previously installed, the furnace being located below the intake 48. The construction shown in Figures 8 and 9 can be operated using the radiator 20, filled with any of the various heating substances and eliminate the furnace.

During the summer time, when ice is used as means of cooling and dehumidifying, the air forced into the air chamber 21, through the radiator 20, over the coil 22, (the latter being connected at one outlet to the city water supply and at the other outlet to the said radiator 20), and over and under a block of ice placed on said coil. As the air fills the air chamber and passes therethrough, that portion of the air passing over and around the ice is not cooled materially, but passes through the baffles into the plenum chamber and to the various rooms or areas to be conditioned with the exception of the rooms or area which it is desired to cool materially. That portion of the air that passes under the ice, comes in contact with the chilled water flowing along the drip pan to the drain, the cold surface of the coil, and the ice, and passes on under pressure exerted by the blower to the diverting partition 38, then passes through the passageway 33, under the partition 34, through the moisture absorbing unit 36, into the passageway 35, and then through the baffles 37 to the passageways 39, 40, and 41, to the rooms or areas to be materially cooled. As the air from beneath the ice passes through the passageway 35, it is mingled with the air that passes over the ice, thus lowering the relative humidity of the chilled air and increasing its temperature to a comfortable degree.

It will be understood that the optional construction referred to in Figure 9 is intended to be used in the summer time and with mechanical refrigeration. The air is then likewise forced into the air chamber 21 by the blower 19, through a radiator 20 containing a refrigerant. The air continues through two divisions of the chamber 21, separated by the partition 47A, the space below said partition containing an adjustable coil 22B connected with mechanical refrigeration. The contacts of the air with the radiator 20 and the coil 22B, chill the air below the dew point, remove the moisture therefrom, precipitating the moisture on the plate 46 along which it flows to the drain. The volume of air is regulated by the partition 47A so that any desired relative humidity and temperature may be secured when operated in conjunction with the refrigerating element. The air passes from the chambers on both sides of the partition 47A through the baffle plates 37, through a moisture absorbing material, preferably of sponge-like material, which absorbs some excess moisture in the air and which, on being rotated over the rollers 36B, contacts with and is pressed by the roller 36C, which pressure extracts the moisture therefrom. The conditioned air then continues to the various connected rooms or areas.

The supplementary coil 45 is positioned at the air intake to utilize the maximum heat or cold content from the exhaust water supply.

Having thus described my invention, I claim as new and desire to secure by Letters Patent of the United States of America:—

1. In an air conditioning system and equipment, a heating unit to heat the air, an air intake, adaptable to supply air to said unit, a plenum chamber, constructed adjacent to said heating unit, and a damper between the heating unit and the plenum chamber, said damper, when open, adaptable to allow the air to circulate through said plenum chamber by gravity to the rooms to be conditioned.

2. In an air conditioning system and equipment, a heating unit to heat the air, an air intake, adaptable to supply air to said heater unit, a plenum chamber, designed to separate the heated air from the conditioned air, an air filter, adaptable to remove dust from the air, an air blower adaptable to circulate the air throughout said system, an air chamber adaptable to have a mist sprayed therein, means to create said mist positioned within said chamber, means to control the water level in said chamber, comprising a train of pipes and connected valve, a series of baffle plates contained in said chamber, adaptable to remove excess moisture from the air, and a heat transfer element, designed to conduct warm water from said chamber, placed in the path of the incoming cool air at the air intake, adaptable to transfer the heat from the coil to the incoming cool air.

3. In an air conditioning equipment and system, a heating unit, an air intake, a plenum chamber, an air chamber, adaptable to hold water, a by-pass, adaptable to eliminate the heating unit, connecting the air intake to a passageway to said air chamber, means in said air chamber adapted to spray water, and means to control the depth of water in said chamber, and a blower to circulate the air through said chamber to the area to be conditioned.

4. In an air conditioning equipment and system, a warm air furnace to heat the air, an air conditioning chamber, adaptable to hold water, a passageway from said furnace to said air chamber, an air filter for cleaning the air, an air intake, means within said chamber adapted to create a mist, and a radiator in said chamber, adaptable to contain a hot substance for heat transfer, baffle plates in said chamber, adaptable to remove excess moisture from the passing air, and a blower for circulating the air through the equipment to the area to be conditioned.

5. In an air conditioning equipment and system, an air intake, having free access to an air conditioning chamber, said chamber adaptable to hold water, a heat transfer element positioned within said intake, means within said chamber to create a mist, said means utilizing the pressure in the connected water mains, a radiator in said chamber adaptable to supply heat to the passing air prior to humidifying the same, a series of baffle plates, adaptable to remove excess moisture from the passing air, means to control the depth of water in said chamber, means to withdraw the coolest portion of said water and pass it through said heat transfer elements, and means to circulate the air through the system.

6. In an air conditioning equipment and system, an air intake, adaptable to supply air to the system, an air conditioning chamber adaptable to contain water, an air passage from said intake to said air conditioning chamber, means within said chamber to create a mist, a heat transfer element within said chamber, a series of baffle plates in said chamber, adaptable to remove excess moisture in the passing air, a fan to circulate said air, a moisture absorbent material and rollers on which to mount said material in said chamber, means to control the water level in said air chamber, comprising a train of pipes and a valve, and a heat transfer element at the intake, adaptable for the passing of the water from said air chamber as it flows from said equipment for disposal.

7. In an air conditioning equipment and system, a warm air furnace, a recirculating duct from the area to be conditioned to the bottom of the furnace, a plural passageway air conditioning chamber, a water spray adaptable to humidify and dehumidify the passing air, an adjustable coil in one of said passageways, adapted as a heat transfer element, baffle plates for removing excess moisture from the air, a second duct connecting said recirculating duct to a passageway to said chamber, and by-passing said furnace, a fan adapted to circulate the air, and an adjustable partition between said passageways, adaptable to control the temperature and humidity of the passing air.

8. In an air conditioning equipment and system, an air intake, a by-pass adaptable to eliminate the heater from the circulating system, an air conditioning chamber, an air filter adaptable to cleanse the air, an air blower, adaptable to circulate the air, a coil and a heat transfer element within said chamber, adaptable to contain a heating or cooling substance, a protected air passageway comprising a duct with a deflector therefor within said chamber, said duct air passageway into said chamber providing an air passage from the coldest conditioned area, means for air control and diverting, comprising a series of partitions and a damper, means for utilizing the maximum cold contained from the water used in the system, comprising a heat transfer element positioned at one of the air intakes and through which the waste water passes, a plenum chamber designed to collect and distribute the conditioned air, and means for supporting ice on the coil and optionally out of contact with it, said means comprising an ice coil and an ice carriage adaptable to be raised and lowered, separate and apart from the coil, by operation of a lever, and when so raised to lift the ice away from contact with the coil.

9. In an air conditioning equipment and system, an air conditioning chamber, a fan to circulate air in said system, a coil and a heat transfer element within said chamber adaptable to contain a refrigerant, a passageway from the coolest connected area to said chamber, a deflector within said chamber adjacent to said passageway, means to support ice on said coil, and means to optionally support the ice out of contact with the coil, a drip pan, designed to afford additional cold surfaces situated near bottom of said chamber, means to divert the coldest air in said chamber to certain connected area, to divert the warmer air to another area, and to control the relative humidity of the air passing to the coolest rooms, said means comprising a series of partitions and damper.

10. In an air conditioning equipment and system, an air chamber, a fan adapted to circulate air therethrough, an adjustable vertical partition in said chamber adapted to form two passageways therein, means for spraying a cold liquid in one of said passageways, and a mixing area connected with said passageways in which to mix the air from the respective passageways.

11. In an air conditioning equipment and system, the combination of a water holding air conditioning chamber, having an inlet and an outlet with a fan adaptable to circulate air therethrough, a coil and a heat transfer element positioned in said chamber, adaptable to contain a substance, said coil also adaptable to support ice, means to raise the ice out of contact with said coil when desired, means to spray a mist within said chamber, means to convey the water in said chamber to a drain and hence to a second heat transfer element positioned within said inlet, means to divert the cold air in said chamber to certain outlets and the warm air to other outlets, and baffle plates, adaptable to remove the excessive moisture from the air.

12. In an air conditioning equipment and system, a water holding air conditioning chamber, a fan to create air motion throughout said system, an air intake, adapted as an air passage for outside air and recirculated air to said chamber, a by-pass duct leading from said intake to said air chamber, means to spray a liquid within said chamber, a coil adapted to support ice, means for raising said ice optionally out of contact with coil, a heat transfer element positioned at said intake, means of conveying the water through said chamber to drain to said last-mentioned heat transfer element that it may chill the incoming air, means to divert the coldest air in said chamber, combine it with warmer air therein, send it to an area desired to be exceptionally cool, and allow the remaining portion of the air to pass to other areas.

13. In an air conditioning equipment and system, a plural passageway air conditioning chamber, an air intake, adaptable to furnish air to said chamber, a heat transfer element and a coil within one of said passageways, adaptable to contain a refrigerant, means for controlling the humidity and temperature of the air going from said chamber to areas to be especially cooled, said means comprising a series of partitions and an adjustable damper placed in the chamber adapted to mix the extremely cold air with warmer air, means for separating the passageway containing the heat transfer element and coil from the other passage, comprising a horizontal partition, and means for diverting the cold air to certain areas apart from the warmer air.

14. In an air conditioning equipment and system, an air conditioning chamber having an air intake and an air outlet, a heat transfer element and a coil therein, both adaptable to contain water and connected with a water supply, said coil adaptable to hold ice thereon, said ice adapted to cool the water in said coil and connected heat transfer element, an air blower adaptable for passing the air from the intake through the heat transfer element, under and over the coil and ice, mixing the warmer air with the dehumidified air, and passing the air thus mixed to the conditioned area, and means to remove the condensation, consisting of a drain in the bottom of said air chamber, and a drip pan to convey the water to said drain.

15. In an air conditioning equipment and system, an air conditioning chamber having an air intake and exhaust, a blower to pass air through the intake, air chamber, and exhaust, an adjustable coil heat transfer element in said chamber adapted to control the temperature and humidity of the passing air, means to create a water spray directed against said coil, to defrost the same, and optionally humidify the air, and means to carry the moisture away, consisting of a drain in the bottom of said air chamber.

16. In an air conditioning equipment and system, the combination of an air conditioning chamber, having an inlet and an outlet, an air fan, adaptable to pass air through said air chamber, two passageways formed within said chamber, one being unobstructed, a refrigerated element in the other passageway, a movable adjustable partition between said passageways, adaptable for controlling the temperature and relative humidity of the air in said passageways, means to pass the air in said respective passageways to the respective areas to be conditioned both warm and cold, and means for optionally mixing the air from said passageways before distributing same, means to optionally spray a mist over said coil, means to drain moisture from chamber, and a drip pan to convey moisture to drain.

17. In an air conditioning equipment and system, an air conditioning chamber having an intake and an outlet, a fan to circulate the air therethrough, a grid positioned within said chamber adapted to support ice, an adjustable ice carriage adaptable to optionally hold ice above said grid when loading and when less chilling is desired, a drain in said chamber, and a drip pan to convey waste water to said drain.

18. In an air conditioning equipment and system, an air conditioning chamber, an air blower adapted to pass air into and through said chamber, a coil within said chamber adaptable to contain a cold substance, means to divert the cold air in said chamber and mix it with a portion of the warm air therein, said means comprising a series of partitions and a damper therein, means to allow the remaining warm air to pass to an area apart from the cool area, a duct connecting the cool area to the air conditioning chamber for the return of the warmer air in the cool area, a protected opening within said chamber for said return duct, adaptable both to prevent air from passing from said chamber into the duct, and to deflect the air in the chamber to the coldest part of the chamber.

19. In an air conditioning equipment and system, the combination of an air conditioning chamber having an inlet and an outlet, a fan, adaptable to force air through said chamber, a heat transfer element adaptable to change the temperature of passing air, and means for diverting the coldest air in the chamber to certain areas and to divert the warm air to other areas, said means comprising a series of partitions and a damper.

20. In an air conditioning equipment and system, an air conditioning chamber having an air intake and air outlet, a drip pan adaptable to support ice and convey water therefrom, and an air moving device adaptable to recirculate air through the air conditioning chamber and the conditioned area, a heat transfer in said air intake adaptable to receive cold water from said conditioning chamber.

21. In an air conditioning equipment and system, an air conditioning chamber, containing a refrigerated coil, means to supply a liquid to exterior surfaces of said coil, a drain to dispose of said liquid, a drip pan to convey said liquid to said drain, an air moving device adaptable to pass air through said chamber, and conditioned area.

22. In an air conditioning system and equipment, a plural passageway air conditioning chamber with an inlet and outlet for air, an air blower adaptable to pass air through said chamber, a heat transfer coil positioned within one passageway of said chamber adaptable to contain a heating or cooling substance, a coil adaptable to contain a refrigerant within said passageway, an adjustable partition forming said plural passageways adaptable for repositioning so as to control, in conjunction of said last mentioned coil, the humidity and temperature of the air.

23. In an air conditioning equipment and system, an air conditioning chamber, an air intake, an air blower adapted to force air into said chamber on its way to the area to be conditioned, a movable vertical partition within said chamber forming two passageways therein, an adjustable coil and heat transfer element in one of said passageways adapted to contain cold substances, the coil optionally adaptable to support ice, means to spray a liquid in said last-mentioned passageway, a coil positioned within said air intake, a drip pan to convey waste liquid to drain in chamber, means to convey water from chamber to said coil in said air intake, a series of baffle plates adaptable to remove excess moisture from the air, and a mixing area connected with the two passageways in which the air from the respective passageways may be mixed or allowed to pass to areas unmixed.

RAYMOND A. SHEFFIELD.